US011914324B2

(12) United States Patent
Fukusada

(10) Patent No.: US 11,914,324 B2
(45) **Date of Patent: *Feb. 27, 2024**

(54) IMAGE FORMING APPARATUS DETERMINING WHETHER CARTRIDGE IS USABLE BASED ON TWO SETS OF CONSUMPTION STATE INFORMATION

(71) Applicant: BROTHER KOGYO KABUSHIKI KAISHA, Nagoya (JP)

(72) Inventor: Yuki Fukusada, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/054,220

(22) Filed: Nov. 10, 2022

(65) Prior Publication Data

US 2023/0068696 A1 Mar. 2, 2023

Related U.S. Application Data

(63) Continuation of application No. 17/213,529, filed on Mar. 26, 2021, now Pat. No. 11,513,471.

(30) Foreign Application Priority Data

Mar. 30, 2020 (JP) ................................. 2020-061000

(51) Int. Cl.
*G03G 15/00* (2006.01)
*G03G 21/18* (2006.01)
*G03G 21/16* (2006.01)

(52) U.S. Cl.
CPC ....... *G03G 21/1882* (2013.01); *G03G 15/556* (2013.01); *G03G 21/1839* (2013.01); *G03G 21/1633* (2013.01)

(58) Field of Classification Search
CPC ........... G03G 21/1633; G03G 21/1839; G03G 21/1882; G03G 15/556
See application file for complete search history.

(56) References Cited

U.S. PATENT DOCUMENTS 6,223,131 B1 4/2001 Kanaya
6,658,219 B1 12/2003 Ito et al.
(Continued)

FOREIGN PATENT DOCUMENTS

JP 2001-100530 A 4/2001
JP 2017-161801 A 9/2017
JP 2002-23569 A 1/2022

OTHER PUBLICATIONS

Office Action issue in corresponding Japanese Application No. 2020-061000, dated Dec. 26, 2023.

*Primary Examiner* — Hoang X Ngo
(74) *Attorney, Agent, or Firm* — Merchant & Gould, P.C.

(57) ABSTRACT

An image forming apparatus includes: a casing having an opening; a cover for opening and closing the opening; a cartridge attachable to the casing through the opening; and a controller. The casing includes a first memory. The cartridge includes a second memory storing consumption state information representing a consumption state of the cartridge. The controller performs: determining whether the cartridge attached to the casing is unused; storing, when the attached cartridge is unused, the consumption state information acquired from the second memory in the first memory; determining, when the image forming apparatus is powered on or the cover is closed, whether the consumption state information in the first memory and the consumption state information in the second memory match; permitting use of the cartridge when the two sets of consumption state (Continued)

information match; and prohibiting use of the cartridge when the two set of consumption state information does not match.

9 Claims, 9 Drawing Sheets

(56) References Cited

U.S. PATENT DOCUMENTS

| | | | | |
|---|---|---|---|---|
| 2004/0207865 | A1 | 10/2004 | Wachter et al. | |
| 2016/0124344 | A1 | 5/2016 | Kojo | |
| 2017/0261884 | A1* | 9/2017 | Kyotani | G03G 15/0865 |
| 2018/0086091 | A1 | 3/2018 | Jeran | |

* cited by examiner

IMAGE FORMING APPARATUS DETERMINING WHETHER CARTRIDGE IS USABLE BASED ON TWO SETS OF CONSUMPTION STATE INFORMATION

CROSS REFERENCE TO RELATED APPLICATION

This application is a continuation of U.S. patent application Ser. No. 17/213,529, filed Mar. 26, 2021, now U.S. Pat. No. 11,513,471, which claims priority from Japanese Patent Application No. 2020-061000 filed Mar. 30, 2020. The entire content of the priority applications is incorporated herein by reference.

TECHNICAL FIELD

The present disclosure relates to an image forming apparatus, a cartridge, and a control method for controlling an image forming apparatus.

BACKGROUND

Typically, an image forming apparatus uses consumables or replaceable parts for performing image formation. An example of a consumable is a cartridge that accommodates toner or ink used for forming images on the image forming apparatus. A replaceable part is a cartridge that must be occasionally replaced as the image forming apparatus is used. Such consumables or replaceable parts can be replaced in image forming apparatuses.

SUMMARY

A cartridge may also possess memory for storing a remaining quantity of a consumable, or life information of a replaceable part. The image forming apparatus has a controller that updates the remaining quantity or life information stored in the memory of the cartridge based on use of the cartridge in forming images. Further, by writing information related to image forming apparatuses in the memory of a cartridge, this information can be used to identify image forming apparatuses that can use the cartridge.

For example, prior art describes a memory provided in a cartridge. When the cartridge is attached to a printer, the controller of the printer controls a memory controller of the cartridge to write a printer identifier to the cartridge memory. In the prior art, the controller of the printer also compares the printer identifier for the printer itself with the printer identifier stored in the cartridge memory and determines that the cartridge can be used when the identifiers match and that the cartridge cannot be used when the identifiers do not match.

The technology described in the prior art requires a printer identifier to be written to a cartridge memory having a relatively small capacity. Consequently, there has been desired a method that can suppress using the memory in a cartridge when determining whether the cartridge can be used in the printer than a method of writing a printer identifier to the cartridge memory.

In view of the foregoing, it is an object of the present disclosure to provide technology for determining whether a cartridge can be used in an image forming apparatus without writing new information to the memory of the cartridge.

In order to attain the above and other objects, according to one aspect, the present disclosure provides an image forming apparatus including a main casing, a cover, a cartridge, and a controller. The main casing has an opening and includes a first memory. The cover is movable between an open position in which the cover opens the opening and a closed position in which the cover closes the opening. The cartridge is attachable to the main casing through the opening. The cartridge includes: material or a part used for forming images; and a second memory storing therein consumption state information representing a consumption state of the cartridge. The controller is configured to perform: determining whether the cartridge attached to the main casing is unused; storing, in response to determining that the cartridge attached to the main casing is unused, the consumption state information acquired from the second memory in the first memory; determining whether power to the image forming apparatus is turned on or whether the cover moves from the open position to the closed position; determining, in response to determining that the cover moves from the open position to the closed position or that power to the image forming apparatus is turned on, whether the consumption state information stored in the first memory and the consumption state information stored in the second memory match each other; permitting use of the cartridge in response to determining that the consumption state information stored in the first memory and the consumption state information stored in the second memory match each other; and prohibiting use of the cartridge in response to determining that the consumption state information stored in the first memory and the consumption state information stored in the second memory do not match each other.

According another aspect, the present disclosure provides a control method for controlling an image forming apparatus. The control method includes: determining whether a cartridge attached to a main casing of the image forming apparatus is unused; storing, in response to determining that the cartridge attached to the main casing is unused, consumption state information stored in a second memory of the attached cartridge in a first memory of the image forming apparatus, the consumption state information representing a consumption state of the cartridge; determining whether power to the image forming apparatus is turned on or whether the cover moves from the open position to the closed position; determining, in response to determining that the cover moves from the open position to the closed position or that power to the image forming apparatus is turned on, whether the consumption state information stored in the first memory and the consumption state information stored in the second memory match each other; permitting use of the cartridge in response to determining that the consumption state information stored in the first memory and the consumption state information stored in the second memory match each other; and prohibiting use of the cartridge in response to determining that the consumption state information stored in the first memory and the consumption state information stored in the second memory do not match each other.

According still another aspect, the present disclosure provides a cartridge including a cartridge casing and a cartridge memory. The cartridge casing includes material or a part used for forming images. The cartridge memory stores therein consumption state information representing a consumption state of the cartridge. Whether the cartridge is usable in an image forming apparatus is determinable based on the consumption state information stored in the cartridge memory.

BRIEF DESCRIPTION OF THE DRAWINGS

The particular features and advantages of the embodiment(s) as well as other objects will become apparent from the following description taken in connection with the accompanying drawings, in which.

DETAILED DESCRIPTION

First Embodiment

Next, an image forming apparatus 1 according to a first embodiment of the present disclosure will be described while referring to the accompanying drawings. In the following description, a direction in which the rotational axis of a developing roller 31 in a toner cartridge 30 extends will be called the "first direction."

Figure 1:
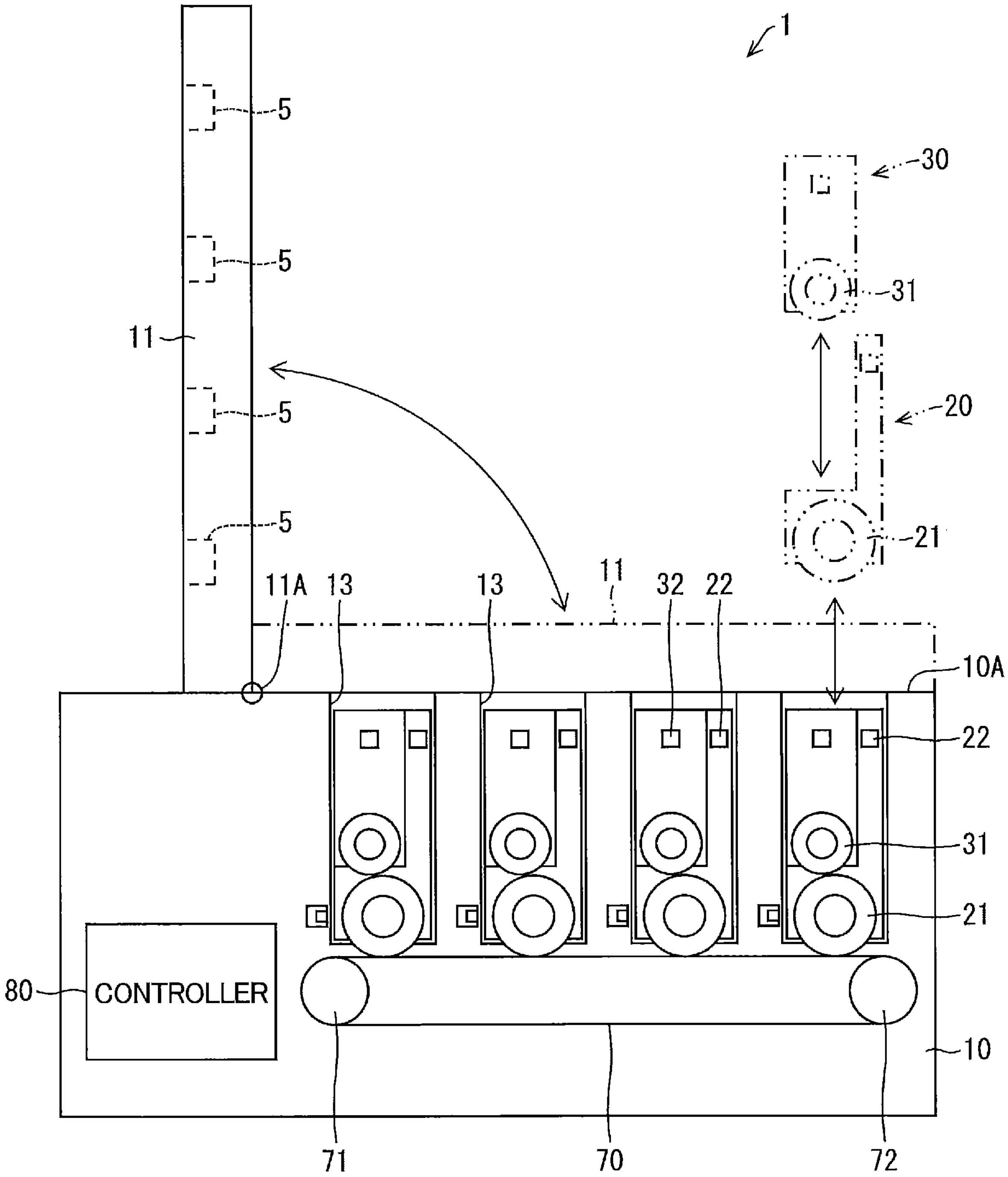
FIG. 1 is a schematic view illustrating an image forming apparatus according to a first embodiment of the present disclosure.
Figure 2:
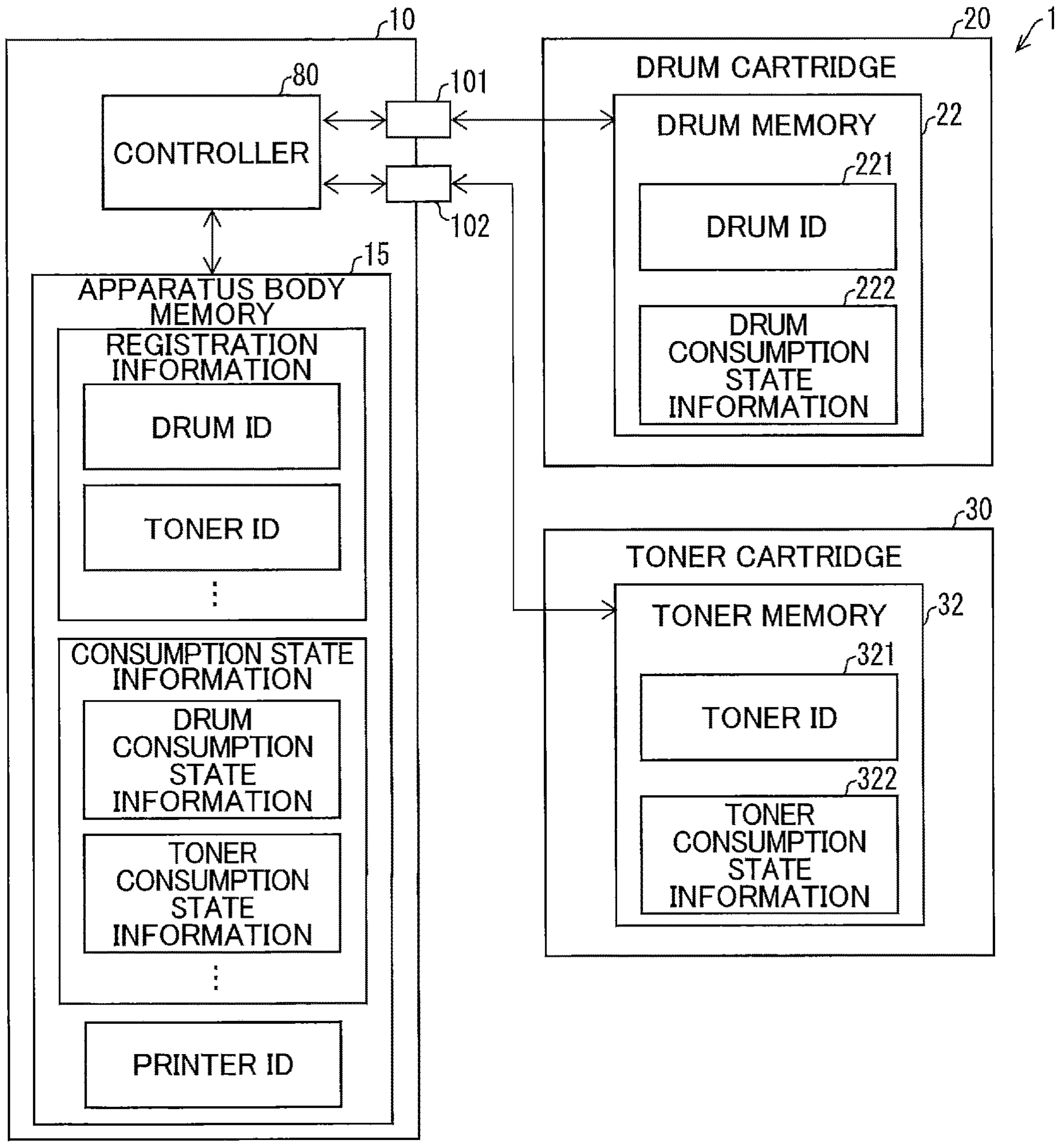
FIG. 2 is a view illustrating mounting of a drum cartridge and a toner cartridge in a main casing of the image forming apparatus.

FIG. 1 is a schematic diagram of the image forming apparatus 1. FIG. 2 is a block diagram illustrating the mounting of drum cartridges 20 and toner cartridges 30 in the main casing 10 of the image forming apparatus 1. The image forming apparatus 1 is an electrophotographic printer. Examples of the image forming apparatus 1 includes a laser printer, an LED printer, and the like.

As shown in FIGS. 1 and 2, the image forming apparatus 1 includes a main casing 10, a cover 11, four drum cartridges 20 as an example of the cartridges, four toner cartridges 30 as an example of the cartridges, a transfer belt 70, and a controller 80. The image forming apparatus 1 also includes four light source units 50 having a one-on-one correspondence with the four drum cartridges 20.

Each toner cartridge 30 becomes integral with the corresponding drum cartridge 20 by being attached to the corresponding drum cartridge 20. That is, each toner cartridge 30 is mountable in the main casing 10 together with the corresponding drum cartridge 20 in a state where the toner cartridge 30 is attached to the corresponding drum cartridge 20.

The main casing 10 has a rectangular box shape. The four drum cartridges 20, four toner cartridges 30, transfer belt 70, and controller 80 are accommodated in the main casing 10. The main casing 10 has four cartridge retaining units 13. Each cartridge retaining unit 13 has a recess that is open in the main casing 10. The drum cartridges 20 and toner cartridges 30 are attached to the main casing 10 by being retained in corresponding cartridge retaining units 13.

Indicators such as liquid crystal displays, lamps, and the like, and input interfaces such as buttons may be provided on the outer surface of the main casing 10. The liquid crystal display may also be configured with a touchscreen that functions as an input interface.

The cover 11 is disposed so as to open and close an opening 10A provided at the upper end of the main casing 10. The cover 11 is pivotably movable about a pivot axis 11A that extends along the first direction between an open position for opening the opening 10A, as depicted with solid lines in FIG. 1, and a closed position for closing the opening 10A, as depicted with two-dot chain lines in FIG. 1. In other words, the cover 11 is movable between the open position and the closed position. The openings of the cartridge retaining units 13 are exposed in the opening 10A when the cover 11 is in the open position and are covered by the cover 11 when the cover 11 is in the closed position.

A cover sensor (not shown) is provided in the opening 10A of the main casing 10. The cover sensor detects that the cover 11 is in the closed position. The cover sensor may be a contact-type sensor or an optical sensor, for example.

Each drum cartridge 20 has a cartridge casing (not shown) that is mountable in the main casing 10. The cartridge casing includes a photosensitive drum 21 as a part used for forming images. The photosensitive drum 21 is a replaceable part. As the photosensitive drum 21 is used, the surface of the photosensitive drum 21 wears or otherwise degrades, requiring the photosensitive drum 21 to be replaced. The photosensitive drum 21 is a cylindrical photosensitive member extending in the first direction. The photosensitive drum 21 is rotatable about a drum axis extending in the first direction. The outer circumferential surface of the photosensitive drum 21 is covered by a photosensitive material.

The drum cartridge 20 also has a drum memory 22 as an example of the second memory. The drum memory 22 is a memory from which information can be read and to which information can be written. For example, the drum memory 22 may be flash ROM (read-only memory) or EEPROM (registered trademark; electrically erasable programmable read-only memory).

The drum memory 22 has a first area 221 and a second area 222 for storing information related to the photosensitive drum 21 of the drum cartridge 20. The first area 221 stores a drum ID as an example of the identification information. The second area 222 stores drum consumption state information as an example of the consumption state information. Note that the drum memory 22 need not necessarily store the drum ID.

The drum ID is a unique serial number for identifying an individual drum cartridge 20. The drum consumption state information represents the consumption state of the drum cartridge 20. More specifically, the drum consumption state information is represented by the degree of consumption of the drum cartridge 20 or the degree of remaining life of the drum cartridge 20 based on consumption of the drum cartridge 20.

The degree of consumption of the drum cartridge 20 is at least one of an accumulated number of rotations of the photosensitive drum 21 and an accumulated number of sheets printed using the photosensitive drum 21, for example. The degree of life remaining of the drum cartridge 20 is at least one of a remaining number of rotations for the drum cartridge 20 and a number of printable sheets using the photosensitive drum 21, for example.

The accumulated number of rotations of the photosensitive drum 21 is calculated in the drum cartridge 20 identified by the drum ID by incrementing the value of a counter each time the drum cartridge 20 is used in printing. The accumulated number of sheets printed using the photosensitive drum 21 is calculated in the drum cartridge 20 identified by the drum ID by incrementing the value of a counter each time the drum cartridge 20 is used in printing.

The remaining number of rotations of the photosensitive drum 21 is calculated in the drum cartridge 20 identified by the ID by decrementing the value of a counter from a prescribed initial number of rotations each time the drum cartridge 20 is used in printing. Further, the number of printable sheets using the photosensitive drum 21 is calculated in the drum cartridge 20 identified by the drum ID by decrementing the value of a counter from a prescribed initial number of printable sheets each time the drum cartridge 20 is used in printing.

In addition to the drum ID and the drum consumption state information, the drum memory 22 may store compatible models of the drum cartridge 20, specifications of the drum cartridge 20, information indicating whether the drum cartridge 20 is a unused cartridge (a new cartridge), information indicating whether the drum cartridge 20 is a genuine product, the error history of the drum cartridge 20, and the like.

Each toner cartridge 30 includes a developing roller 31, and a cartridge casing (not shown) that can accommodate developing agent as an example of the printing material. The cartridge casing of each toner cartridge 30 accommodates toner as an example of the developing agent. The cartridge casing is mountable in the main casing 10. The four toner cartridges 30 accommodate toner in different colors (for example, the colors cyan, magenta, yellow, and black) as the material used for forming images. The developing agent is a consumable that becomes depleted during use.

The developing roller 31 is a cylindrical member that extends along the first direction and is rotatable about a developing axis extending in the first direction. When the toner cartridge 30 is attached to the drum cartridge 20, the outer circumferential surface of the photosensitive drum 21 contacts the outer circumferential surface of the developing roller 31.

The toner cartridge 30 also includes a toner memory 32 as an example of the second memory. The toner memory 32 is positioned at the outer surface of the toner cartridge 30 at one end in the first direction. The toner memory 32 is a memory from which information can be read and to which information can be written. For example, the toner memory 32 may be flash ROM or EEPROM (registered trademark).

The toner memory 32 has a first area 321 and a second area 322 for storing information related to the toner cartridge 30. The first area 321 stores a toner ID as an example of the identification information. The second area 322 stores toner consumption state information as an example of the consumption state information. Data in the second area 322 can be rewritten a plurality of times. Note that the toner memory 32 need not necessarily store the toner ID.

The toner ID is a unique serial number for identifying an individual toner cartridge 30, for example. The toner consumption state information represents the consumption state of the toner cartridge 30. More specifically, the toner consumption state information is represented by the degree of consumption of the toner cartridge 30 or the degree of remaining life of the toner cartridge 30 based on consumption of the toner cartridge 30.

The degree of consumption of the toner cartridge 30 is at least one of an accumulated number of rotations of the developing roller 31, an accumulated number of sheets printed using the developing roller 31, and an accumulated number of dots formed using the developing roller 31, for example. The degree of remaining life of the toner cartridge 30 is at least one of a remaining number of rotations for the developing roller 31, a number of printable sheets using the developing roller 31, and a remaining number of dots that can be formed using the developing roller 31, for example.

The accumulated number of rotations of the developing roller 31 is calculated in the single toner cartridge 30 identified by the toner ID by incrementing the value of a counter each time the toner cartridge 30 is used for printing. The accumulated number of sheets printed using the developing roller 31 is calculated in the single toner cartridge 30 identified by the drum ID by incrementing the value of a counter each time the toner cartridge 30 is used for printing. The accumulated number of dots formed using the developing roller 31 is calculated in the single toner cartridge 30 identified by the ID by incrementing the value of a counter each time the toner cartridge 30 is used for printing.

The remaining number of rotations of the developing roller 31 is calculated in the single toner cartridge 30 identified by the drum ID by decrementing the value of a counter from a prescribed initial number of rotations each time the toner cartridge 30 is used for printing. The number of printable sheets using the developing roller 31 is calculated in the single toner cartridge 30 identified by the toner ID by decrementing the value of a counter from a prescribed initial number of printable sheets each time the toner cartridge 30 is used for printing. The remaining number of dots that can be formed using the developing roller 31 is calculated in the single toner cartridge 30 identified by the toner ID by decrementing the value of a counter from a prescribed initial number of dots each time the toner cartridge 30 is used for printing.

In addition to the toner ID and the toner consumption state information, the toner memory 32 may store the compatible models of the toner cartridge 30, specifications of the toner cartridge 30, information indicating whether the toner cartridge 30 is a unused cartridge (a new cartridge), information indicating whether the toner cartridge 30 is a genuine product, error history of the toner cartridge 30, and the like.

As shown in FIG. 1, the drum cartridges 20 and toner cartridges 30 are attached to the main casing 10 in a state where the cover 11 is in its open position. In this state, the drum cartridges 20 and toner cartridges 30 are inserted through the opening 10A into the corresponding cartridge retaining units 13.

The main casing 10 also includes four connectors 101. When the drum cartridges 20 are inserted into the corresponding cartridge retaining units 13, the drum memory 22 of each drum cartridge 20 is electrically connected to the corresponding connector 101. These connections enable the controller 80 of the main casing 10 to communicate (exchange data) with the drum memories 22 in the drum cartridges 20.

The main casing 10 also includes four connectors 102. When the toner cartridges 30 are attached to the main casing 10, the toner memory 32 of each toner cartridge 30 is electrically connected to the corresponding connector 102. These connections enable the controller 80 of the main casing 10 to communicate with the toner memories 32 in the toner cartridges 30.

The four light source units 5 are mounted on the inner surface of the cover 11. In a state where the drum cartridges 20 are attached to the main casing 10 and the cover 11 is in its closed position, each light source unit 5 is positioned so as to face the surface of the corresponding photosensitive drum 21. Each light source unit 5 has a plurality of light sources aligned in the first direction. The light sources can irradiate light onto the outer circumferential surface of the corresponding photosensitive drum 21. The light sources may be light-emitting diodes (LEDs), for example.

Each light source unit 5 is electrically connected to the controller 80. The controller 80 controls the light sources of each light source unit 5 to emit light based on inputted image data. In response to this control, the light sources irradiate light toward the outer circumferential surface of the corresponding photosensitive drum 21. As a result, the photosensitive material on the outer circumferential surface of the corresponding photosensitive drum 21 is exposed according to the image data.

The transfer belt 70 is a part used for transferring developing agent (toner, for example) on the surface of the photosensitive drum 21 onto printing sheets. The transfer belt 70 is a replaceable part. As the transfer belt 70 is used, the surface of the transfer belt 70 becomes worn or otherwise degrades, requiring the transfer belt 70 to be replaced. The transfer belt 70 is a belt having an annular shape (an endless belt) that can contact each of the photosensitive drums 21. In other words, the outer circumferential surfaces of the photosensitive drums 21 can contact the outer surface of the transfer belt 70. During a printing process, printing sheets are conveyed between the transfer belt 70 and the photosensitive drums 21.

The transfer belt 70 is stretched around a drive roller 71 and a follower roller 72. The controller 80 controls the drive roller 71 to rotate. The drive roller 71 drives the transfer belt 70 to circulate. The follower roller 72 rotates in accordance with movement of the transfer belt 70 driven by the drive roller 71.

The controller 80 has an application-specific integrated circuit (ASIC), for example. The controller 80 is electrically connected to an apparatus body memory 15 provided in the main casing 10. The apparatus body memory 15 is an example of the first memory. The controller 80 executes various processes to cause the image forming apparatus 1 to perform a printing process and accompanying processes.

The controller 80 may include a processor, such as a CPU. In this case, a control program for implementing a control method for image formation may be saved in the apparatus body memory 15. The processor executes operations according to the control program so that the controller 80 can control the image forming apparatus 1 to perform a printing process.

The controller 80 may also include a computer-readable storage medium that stores the control program. Here, the storage medium may be a "non-transitory, tangible medium," such as ROM, a tape, a disc, a card, semiconductor memory, or a programmable logic circuit. Random-access memory (RAM) may also be used for developing the control program. The control program may also be supplied to the computer described above via any transmission medium (a communication network, broadcast waves, etc.) capable of transmitting the control program. Note that, in one embodiment of the present disclosure, the control program can be implemented in the form of data signals embedded in a carrier wave, as embodied in electronic transmission.

When the drum cartridge 20 and toner cartridge 30 are attached to the corresponding cartridge retaining unit 13 of the main casing 10, the drum memory 22 and toner memory 32 are electrically connected to the controller 80, as illustrated in FIG. 2. Consequently, the controller 80 can execute a process to read information from the drum memory 22 and toner memory 32 and a process to write information (including a rewriting process) to the drum memory 22 and toner memory 32.

The apparatus body memory 15 is a memory from which information can be read and to which information can be written. The apparatus body memory 15 is flash ROM or EEPROM (registered trademark), for example. The apparatus body memory 15 stores registration information, initial value information, lifetime information, usage information, and consumption state information.

Registration information includes the drum ID read from the drum memory 22, and the toner ID read from the toner memory 32.

The consumption state information includes the drum consumption state information and the toner consumption state information. Similar to the drum consumption state information stored in the drum memory 22, the drum consumption state information is, for example, at least one of the accumulated number of rotations of the photosensitive drum 21 and the accumulated number of sheets printed using the photosensitive drum 21. Similar to the toner consumption state information stored in the toner memory 32, the toner consumption state information is, for example, at least one of the accumulated number of rotations of the developing roller 31, the accumulated number of sheets printed using the developing roller 31, and the accumulated number of dots formed using the developing roller 31.

The apparatus body memory 15 may also store a printer ID. The printer ID is identification information, such as a serial number, for identifying an individual image forming apparatus.

Figure 3:
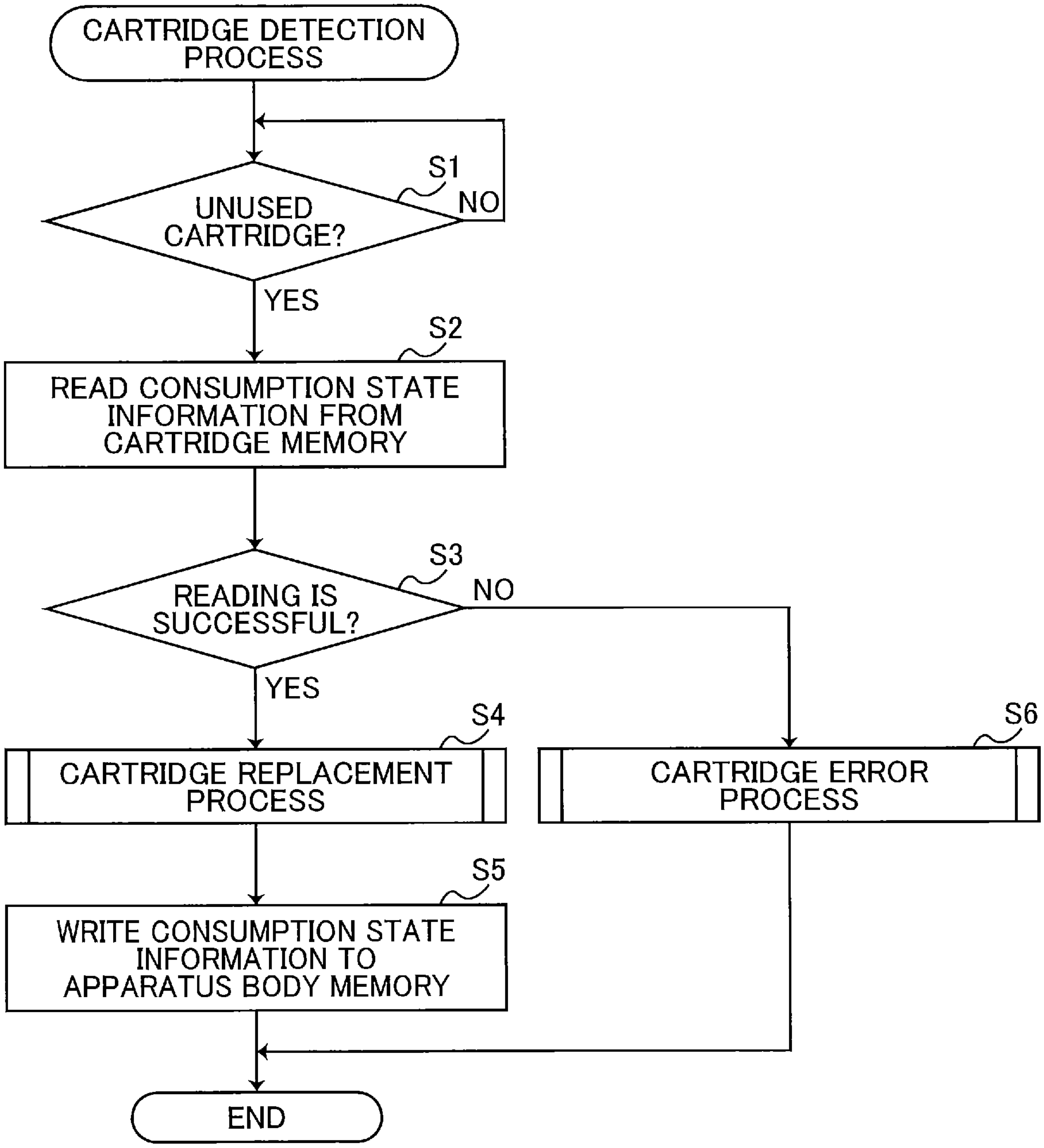
FIG. 3 is a flowchart illustrating steps in a cartridge detection process executed by a controller of the image forming apparatus.

Next, a cartridge detection process performed by the image forming apparatus 1 for detecting drum cartridges 20 and toner cartridges 30 will be described. FIG. 3 is a flowchart illustrating steps in the cartridge detection process executed by the controller 80 of the image forming apparatus 1.

In the following description, the detection process performed when at least one of the drum cartridges 20 and toner cartridges 30 is replaced will be described. Accordingly, when the drum cartridge 20 or toner cartridge 30 is not specified, the drum cartridge 20 or toner cartridge 30 will simply be referred to as "the cartridge." Similarly, when the drum cartridge 20 or toner cartridge 30 is not specified, the drum memory 22 or toner memory 32 of the corresponding drum cartridge 20 or toner cartridge 30 will simply be referred to as "the cartridge memory."

In S1 of FIG. 3, the controller 80 determines whether a cartridge attached to the main casing 10 is unused (first determination process). The controller 80 makes this determination based on information stored in the cartridge memory specifying whether the cartridge is unused. Alternatively, when a toner cartridge 40 has a detection gear 56 as in the second embodiment described later (see FIG. 9), the controller 80 may determine whether the toner cartridge 40 is unused based on the rotation of the detection gear 56. This configuration will be described in greater detail in the second embodiment.

When the controller 80 determines in S1 that the attached cartridge is not unused (S1: NO), the controller 80 repeats the determination of S1 until an unused cartridge is attached to the main casing 10. Alternatively, in this case, the controller 80 may end the cartridge detection process.

When the controller 80 determines in S1 that the attached cartridge is unused (S1: YES), in S2 the controller 80 reads the consumption state information from the cartridge memory of the attached cartridge. In S3 the controller 80 determines whether the reading of the consumption state information from the cartridge memory is successful. When the controller 80 determines that the reading of the consumption state information from the cartridge memory is successful (S3: YES), in S4 the controller 80 performs a cartridge replacement process. In the cartridge replacement process, the controller 80 stops displaying a "replace cartridge" warning and resets a counter used for counting the consumption state information stored in the apparatus body memory 15.

In S5 the controller 80 writes the consumption state information read from the cartridge to the apparatus body memory 15 to thereby store that consumption state information in the apparatus body memory 15 (storage process), and subsequently ends the cartridge detection process.

On the other hand, when the controller 80 determines in S3 that the reading of the consumption state information from the cartridge memory is not successful (S3: NO), in S6 the controller 80 performs a cartridge error process and subsequently ends the cartridge detection process. In the cartridge error process, the controller 80 notifies the user that the cartridge that reaches the end-of-life cannot be used. Alternatively, in the cartridge error process, the controller 80 may notify the user of occurrence of an error.

Figure 4:
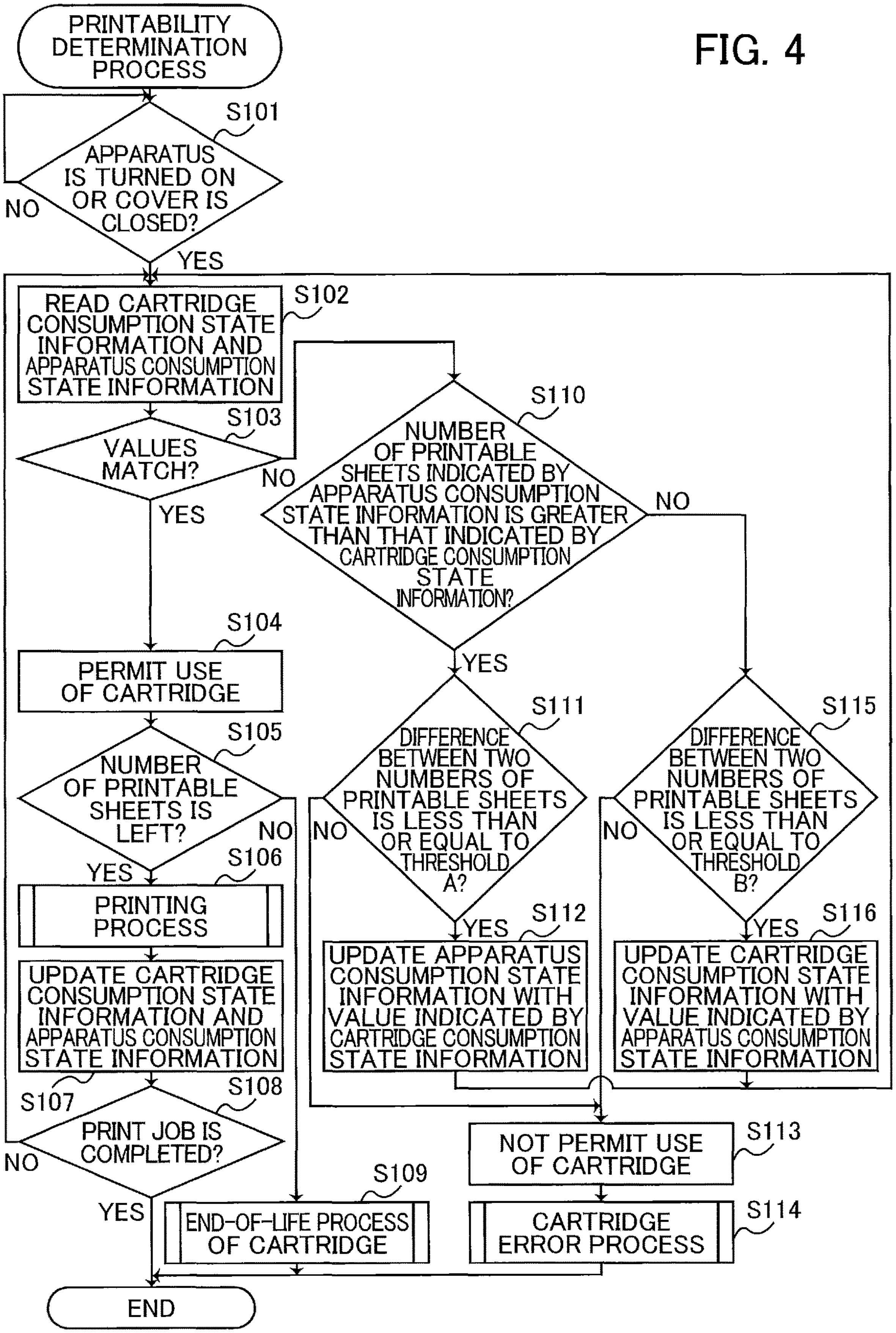
FIG. 4 is a flowchart illustrating steps in a printability determination process executed by the controller.

Next, a printability determination process (control method) executed on the image forming apparatus 1 will be described. FIG. 4 is a flowchart illustrating steps in the printability determination process executed by the controller 80 of the image forming apparatus 1.

In S101 of FIG. 4, the controller 80 first determines whether the power to the image forming apparatus 1 is turned on or, based on output from the cover sensor described above, whether the cover 11 moves from the open position opening the opening 10A to the closed position (i.e., whether the position of the cover 11 is changed from the open position to the closed position) (second determination process).

Power to the image forming apparatus 1 being turned on does not necessarily indicate that a cartridge is replaced. However, power to the image forming apparatus 1 being turned on is likely to indicate that a cartridge is replaced. This is because, typically, a cartridge is replaced while power to the image forming apparatus 1 is off, and then, the power to the image forming apparatus 1 is turned back on. Accordingly, in response to determining that power to the image forming apparatus is turned on, the controller 80 recognizes that a cartridge is replaced. Further, when the position of the cover 11 is changed from the open position to the closed position, the controller 80 recognizes that a cartridge is replaced. This is because opening and closing of the cover 11 are always performed when a cartridge is replaced.

In S102 the controller 80 reads both the consumption state information stored in the cartridge and the consumption state information stored in the apparatus body memory 15. In S103 the controller 80 determines whether the two sets of consumption state information read in S102 match (third determination process). When the controller 80 determines that the two sets of consumption state information match (S103: YES), in S104 the controller 80 permits use of the cartridge (first control process).

Subsequently, the controller 80 determines in S105 whether the number of printable sheets is left. Specifically, the controller 80 calculates the number of printable sheets based on the read consumption state information and performs the above-described determination in S105 (i.e., determination whether the cartridge is usable) based on the calculated number of printable sheets.

When the controller 80 determines in S105 that the number of printable sheets is still left (S105: YES), in S106 the controller 80 performs a printing process. After completing the printing process, in S107 the controller 80 updates both the consumption state information in the cartridge and the consumption state information in the apparatus body memory 15 based on the number of sheets printed in the printing process.

In S108 the controller 80 determines whether the prescribed print job is complete. When the controller 80 determines in S108 that the prescribed print job is complete (S108: YES), the controller 80 ends the printability determination process. However, when the controller 80 determines that the prescribed print job is not complete (S108: NO), the controller 80 returns to S102.

However, when the controller 80 determines in S105 that the number of printable sheets is not left (S105: NO), in S109 the controller 80 executes an end-of-life process. In the end-of-life process, the controller 80 notifies the user that the cartridge that reaches its end-of-life cannot be used.

Further, when the controller 80 determines in S103 that the two sets of consumption state information do not match (S103: NO), in S110 the controller 80 determines whether the number of printable sheets indicated by the consumption state information stored in the apparatus body memory 15 (first number of image-formable sheets) is greater than the number of printable sheets indicated by the consumption state information in the cartridge (second number of image-formable sheets) (fourth determination process). The number of printable sheets is determined based on the consumption state information. Accordingly, the controller 80 makes this determination by comparing the consumption state information in the cartridge to the consumption state information in the apparatus body memory 15. Note that, instead of the above determination in S110, the controller 80 may determine in S110 whether the number of printable sheets indicated by the consumption state information stored in the apparatus body memory 15 (first number of image-formable sheets) is less than the number of printable sheets indicated by the consumption state information in the cartridge (second number of image-formable sheets).

When the controller 80 determines in S110 that the number of printable sheets indicated by the consumption state information in the apparatus body memory 15 is greater (S110: YES), in S111 the controller 80 determines whether the difference between the numbers of printable sheets is less than or equal to a threshold A (fifth determination process). The threshold A is set to a small value (a single-digit value), for example.

When the controller 80 determines in S111 that the difference between the two numbers of printable sheets is less than or equal to the threshold A (S111: YES), in S112 the controller 80 updates the consumption state information in the apparatus body memory 15 with the value of the consumption state information in the cartridge (updating process) and subsequently returns to S102. However, when the controller 80 determines that the difference between the two numbers of printable sheets is greater than the threshold A (S111: NO), in S113 the controller 80 prohibits (i.e., does not permit) use of the cartridge, i.e., the controller 80 prohibits use of the cartridge (second control process). Thereafter, in S114 the controller 80 executes the cartridge error process.

However, when the controller 80 determines in S110 that the number of printable sheets indicated by the consumption state information in the apparatus body memory 15 is not greater (S110: NO), in S115 the controller 80 determines whether the difference between the two numbers of printable sheets is less than or equal to a threshold B (fifth determination process). The threshold B is set to a small value (a single-digit value), for example. The threshold B may be the same value as the threshold A or a different value.

When the controller 80 determines in S115 that the difference between the two numbers of printable sheets is less than or equal to the threshold B (S115: YES), in S116 the controller 80 updates the consumption state information in the cartridge with the value of the consumption state information in the apparatus body memory 15 (updating process) and subsequently returns to S102. However, when the controller 80 determines that the difference between the two numbers of printable sheets is greater than the threshold B (S115: NO), the controller 80 advances to S113 described above.

In the image forming apparatus 1 according to the present embodiment described above, the controller 80 executes the first determination process, second determination process, third determination process, storage process, first control process, and second control process. With this configuration, the image forming apparatus 1 uses consumption state information that varies according to the consumption state of the cartridge to determine whether the cartridge attached to the main casing is usable. Thus, no new information is required for determining whether a cartridge can be used. Accordingly, the image forming apparatus 1 can determine, without writing new information to the memory of the cartridge, whether a cartridge can be used in the image forming apparatus 1.

The cartridge memory may also store a unique ID for the cartridge (a drum ID or a toner ID). In this case, the controller 80 determines in the first or second control process whether to permit use of the cartridge based on consumption state information stored in each of the apparatus body memory 15 and cartridge memory without using the ID stored in the cartridge memory.

Thus, even in a case where identification information is stored in the cartridge stores, the controller 80 can determine whether a cartridge is usable based on the consumption state information without using the identification information.

As described above, the controller executes the first determination process, fifth determination process, and updating process. In the second control process, the controller 80 prohibits (i.e., does not permit) use of a cartridge when determining in the fifth determination process that the difference between the first number of image-formable sheets and second number of image-formable sheets exceeds a prescribed value.

With this configuration, in a case where the difference between the first number of image-formable sheets and second number of image-formable sheets is less than the prescribed value, there is a possibility that this difference is not large because an error or the like occurred when storing consumption state information in the second memory. In such a case, the image forming apparatus 1 adopts the consumption state information corresponding to the smaller of the first number of image-formable sheets and second number of image-formable sheets. The image forming apparatus 1 updates the consumption state information in the cartridge memory or the consumption state information in the apparatus body memory 15 to the adopted consumption state information. Thus, when the difference between the first number of image-formable sheets and second number of image-formable sheets is less than the prescribed value, the image forming apparatus 1 can make the consumption state information stored in the cartridge memory and the apparatus body memory 15 consistent with each other and can determine whether the attached cartridge is usable.

Next, a modification of the above-described embodiment will be described. In the image forming apparatus 1 described above, the drum cartridges 20 and toner cartridges 30 are attached as cartridges. However, the transfer belt 70 may also be configured as a cartridge that can be attached to the image forming apparatus 1. A transfer belt 70 with this configuration also possesses a memory similar to the drum memory 22. This memory stores an ID for the transfer belt 70, and consumption state information for the transfer belt 70. The consumption state information for the transfer belt 70 is at least one of an accumulated number of circulations of the transfer belt 70 and an accumulated number of sheets printed using the transfer belt 70.

The controller 80 determines whether the cartridge of the transfer belt 70 can be used in the image forming apparatus 1 by performing the same process described in FIGS. 3 and 4 for the drum cartridges 20 and toner cartridges 30.

The structures of the drum cartridge 20 and toner cartridge 30 are not limited to those described in the embodiment. For example, a structure in which the drum cartridge 20 includes the developing roller 31 may be employed instead of the above-described structure in which the toner cartridge 30 includes the developing roller 31. Alternatively, the toner cartridge 30, a developing device (the developing roller 31), and the drum cartridge 20 may all be provided separately. Further, the drum cartridge 20 and toner cartridge 30 may be configured as an integral cartridge.

Second Embodiment

Next, an image forming apparatus 1A according to a second embodiment of the present disclosure will be described, wherein the elements in the second embodiment that have the same functions as those of the elements in the first embodiment are designated with the same reference numerals to avoid duplicating description.

Figure 5:
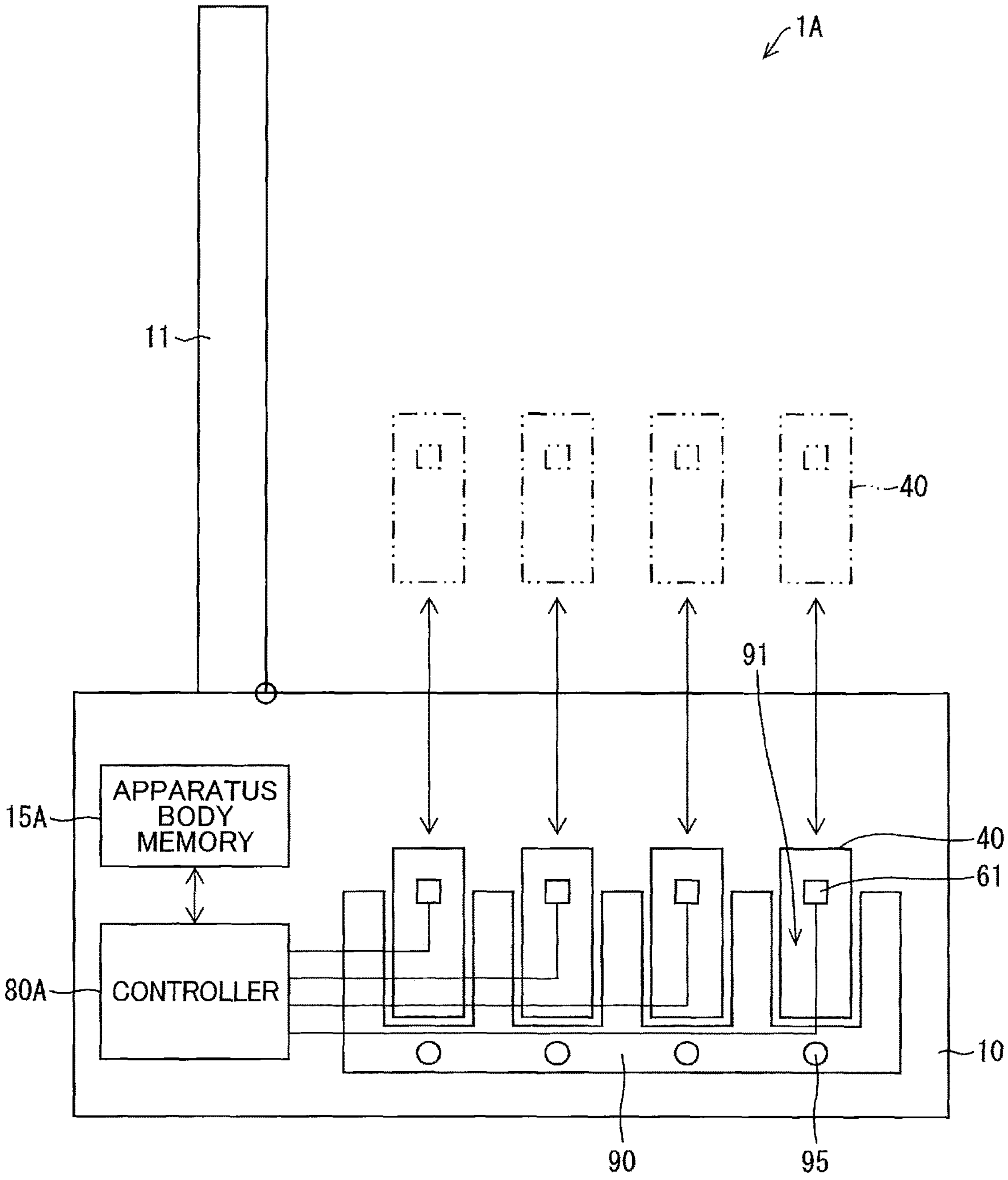
FIG. 5 is a schematic view illustrating an image forming apparatus according to a second embodiment of the present disclosure.
Figure 6:
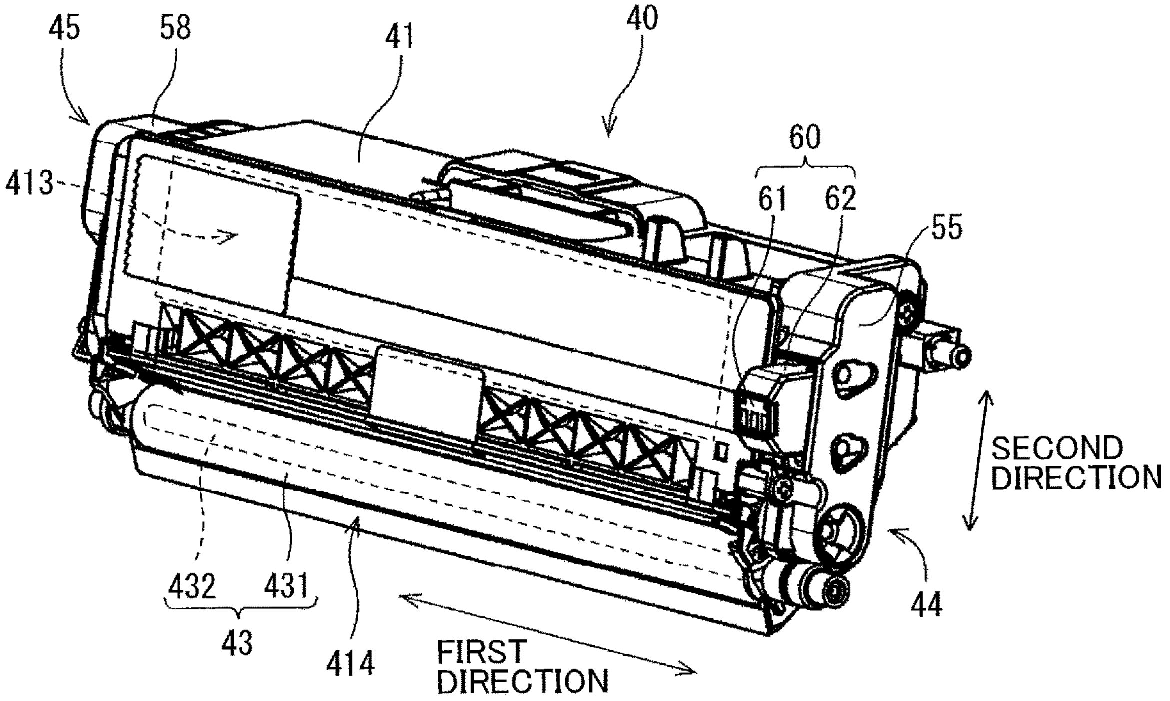
FIG. 6 is a perspective view of a toner cartridge in the image forming apparatus illustrated in FIG. 5.
Figure 7:
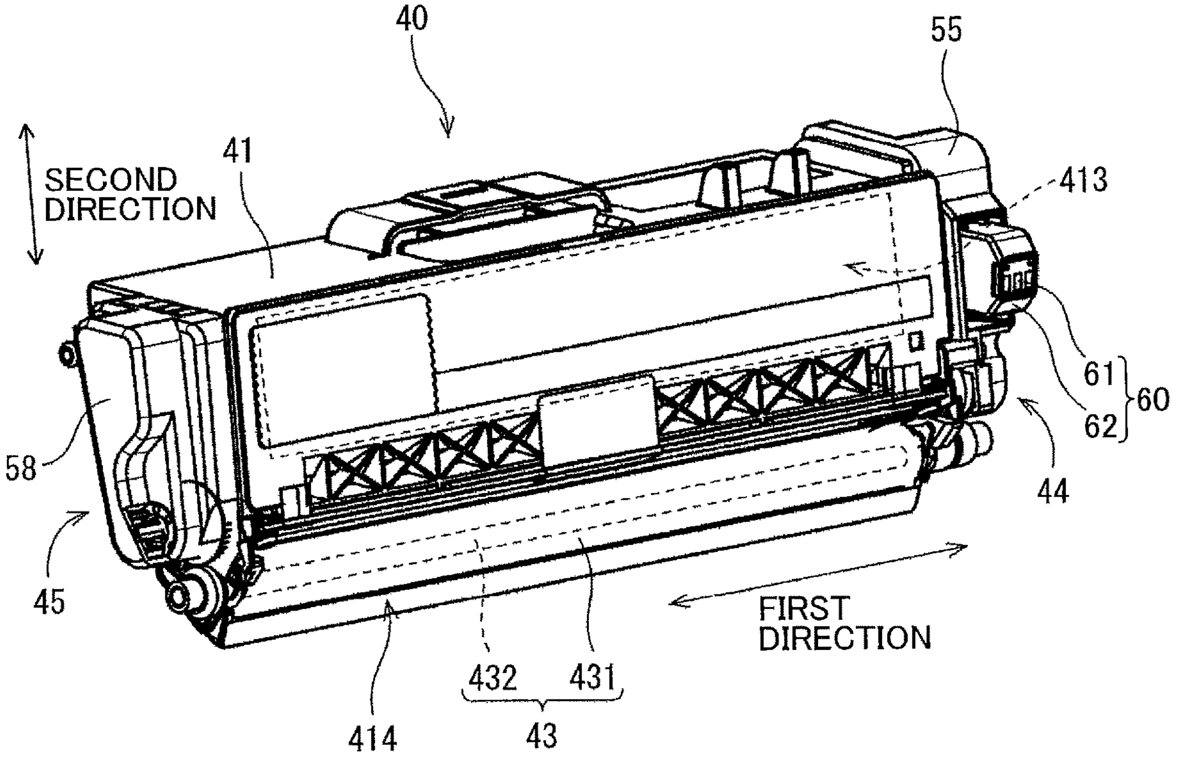
FIG. 7 is another perspective view of the toner cartridge illustrated in FIG. 6.

FIG. 5 is a schematic diagram of the image forming apparatus 1A. The image forming apparatus 1A is an electrophotographic printer. Examples of an image forming apparatus 1A are a laser printer and an LED printer. The image forming apparatus 1A includes four toner cartridges 40, and a drawer unit 90. The drawer unit 90 is a frame that can retain the four toner cartridges 40. The image forming apparatus 1A forms images on the recording surface of a printing sheet using toner supplied from the four toner cartridges 40.

The toner cartridges 40 are individually replaceable in the drawer unit 90 in a state where the drawer unit 90 is pulled out from the front surface of the image forming apparatus 1A. Specifically, the drawer unit 90 has four slots 91 provided therein for retaining the toner cartridges 40. Each toner cartridge 40 can be removed from and attached to the corresponding slot 91 provided in the drawer unit 90. A photosensitive drum 95 is disposed near the bottom of each of the four slots 91.

As shown in FIG. 5, each of the toner cartridges 40 has a toner memory 61. The toner memory 61 is a memory from which information can be read and to which information can be written. The image forming apparatus 1A also includes a controller 80A. The controller 80A has a processor, such as a CPU, and various memory. As with the controller 80 in the first embodiment, the controller 80A may perform operations in accordance with programs to thereby cause the image forming apparatus 1A to execute a printing process.

When the toner cartridges 40 are attached to the corresponding slots 91, the toner memories 61 on the toner cartridges 40 are electrically connected to the controller 80A.

FIGS. 6 through 9 are perspective views of the toner cartridge 40. As shown in FIGS. 6 through 9, each toner cartridge 40 has a casing 41, an agitator 42, a developing roller 43, a first gear unit 44, a second gear unit 45, and a memory chip assembly 60.

The casing 41 is a housing that can accommodate therein toner. The casing 41 has a first end surface 411 and a second end surface 412 and is elongated in the first direction between the first end surface 411 and second end surface 412. The first gear unit 44 and memory chip assembly 60 are positioned at the first end surface 411. The second gear unit 45 is positioned at the second end surface 412. An accommodating chamber 413 that accommodates toner is provided inside the casing 41.

The casing 41 has an opening 414. The opening 414 is positioned at an end of the casing 41 in a second direction orthogonal to the first direction. The accommodating chamber 413 communicates with the outside of the casing 41 through the opening 414.

The agitator 42 has an agitator shaft 421, and an agitating fin 422. A first agitator gear 50 and a second agitator gear 51 described later are respectively coupled to opposite ends of the agitator shaft 421 in the first direction. Therefore, the agitator shaft 421 and agitating fin 422 rotate together with the first agitator gear 50 and second agitator gear 51. When rotated, the agitating fin 422 agitates toner inside the accommodating chamber 413.

The developing roller 43 is rotatable about a rotational axis extending in the first direction. The developing roller 43 is disposed in the opening 414 of the casing 41. The developing roller 43 has a developing-roller body 431 and a developing-roller shaft 432. The developing-roller body 431 is a cylindrical member that extends in the first direction. The developing-roller shaft 432 is a columnar member that penetrates the developing-roller body 431 in the first direction. The developing-roller body 431 is fixed on the developing-roller shaft 432 so as to be incapable of rotating relative to the developing-roller shaft 432.

One end of the developing-roller shaft 432 in the first direction is fixed to a developing roller gear 53 described later and the developing-roller shaft 432 is incapable of rotating relative to the developing roller gear 53. Hence, when the developing roller gear 53 rotates, the developing-roller shaft 432 rotates and the developing-roller body 431 also rotates together with the developing-roller shaft 432.

Figure 8:
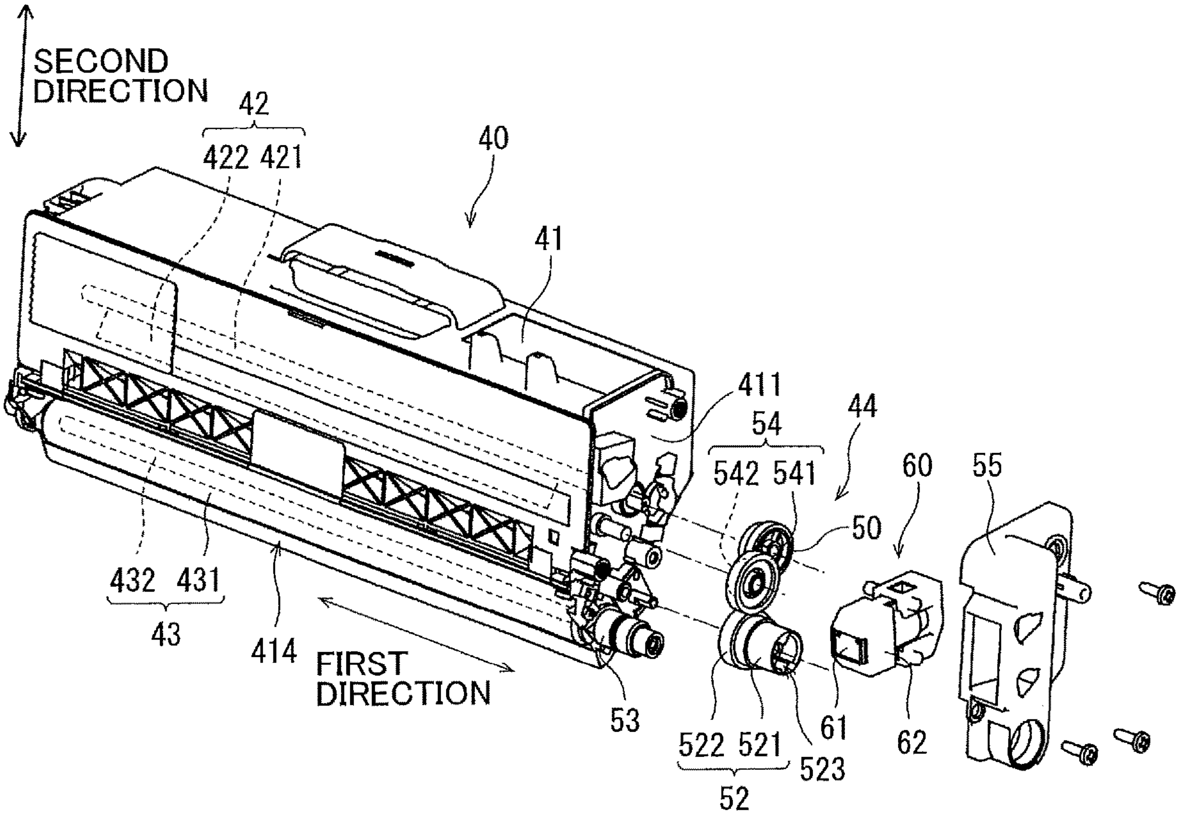
FIG. 8 is an exploded perspective view of the toner cartridge illustrated in FIG. 6.

As shown in FIG. 8, the first gear unit 44 is positioned at the first end surface 411 of the casing 41. The first gear unit 44 includes the first agitator gear 50, a coupling 52, a developing roller gear 53, an idle gear 54, and a first cover 55.

The coupling 52 is the gear that first receives a drive force supplied from the image forming apparatus 1A. The coupling 52 is rotatable about a rotational axis extending in the first direction. The coupling 52 includes a coupling part 521, and a coupling gear 522. The coupling part 521 has a fastening hole 523 that is recessed in the first direction. A plurality of gear teeth is provided on the outer circumferential portion of the coupling gear 522. The gear teeth are arranged at regular intervals around the entire circumference of the coupling gear 522.

When the drawer unit 90 is accommodated in the image forming apparatus 1A in a state where the toner cartridges 40 is attached to the drawer unit 90, drive shafts in the image forming apparatus 1A are inserted into the fastening holes 523 of the corresponding coupling parts 521. With this configuration, the drive shafts are coupled to the corresponding coupling parts 521 so as to be incapable of rotating relative to the same. Hence, when each drive shaft rotates, the corresponding coupling part 521 rotates and the corresponding coupling gear 522 also rotates together with the coupling part 521.

The developing roller gear 53 is a gear for rotating the corresponding developing roller 43. The developing roller gear 53 is rotatable about a rotational axis extending in the first direction. Gear teeth are provided at regular intervals around the entire outer circumferential portion of the developing roller gear 53. A portion of the gear teeth on the coupling gear 522 and a portion of the gear teeth on the developing roller gear 53 are in meshing engagement with each other. The developing roller gear 53 is mounted on one end in the first direction of the developing-roller shaft 432 of the developing roller 43 so as to be incapable of rotating relative to the developing-roller shaft 432. Hence, when the coupling gear 522 rotates, the developing roller gear 53 rotates and the developing roller 43 also rotates together with the developing roller gear 53.

The idle gear 54 is a gear for transmitting the rotation of the coupling gear 522 to the first agitator gear 50. The idle gear 54 is rotatable about a rotational axis extending in the first direction. The idle gear 54 has a large-diameter gear part 541 and a small-diameter gear part 542 juxtaposed in the first direction. The small-diameter gear part 542 is positioned between the large-diameter gear part 541 and the first end surface 411 of the casing 41.

A portion of the gear teeth on the coupling gear 522 and a portion of the gear teeth on the large-diameter gear part 541 are in meshing engagement with each other. Similarly, a portion of the gear teeth on the small-diameter gear part 542 and a portion of the gear teeth on the first agitator gear 50 are in meshing engagement with each other. When the coupling gear 522 rotates, both the large-diameter gear part 541 and small-diameter gear part 542 rotate together and the first agitator gear 50 also rotates along with the rotation of the small-diameter gear part 542.

The first agitator gear 50 is a gear for rotating the agitator 42 inside the accommodating chamber 413. The plurality of gear teeth is provided at regular intervals around the entire outer circumferential portion of the first agitator gear 50. As described above, some of the gear teeth on the small-diameter gear part 542 are in meshing engagement with some of the gear teeth on the first agitator gear 50. Further, the first agitator gear 50 is fixed to one end in the first direction of the agitator shaft 421 so as to be incapable of rotating relative to the agitator shaft 421. Accordingly, when a drive force is transmitted to the first agitator gear 50 from the coupling 52 via the idle gear 54, the first agitator gear 50 rotates and the agitator 42 also rotates together with the first agitator gear 50.

The first cover 55 is fixed to the first end surface 411 of the casing 41 by screws, for example. The coupling gear 522, developing roller gear 53, idle gear 54, and first agitator gear 50 are accommodated between the first end surface 411 and the first cover 55. The fastening hole 523 of the coupling part 521 is exposed on the outside of the first cover 55. The first cover 55 also serves as a holder cover that retains a holder 62 of the memory chip assembly 60 described later.

Figure 9:
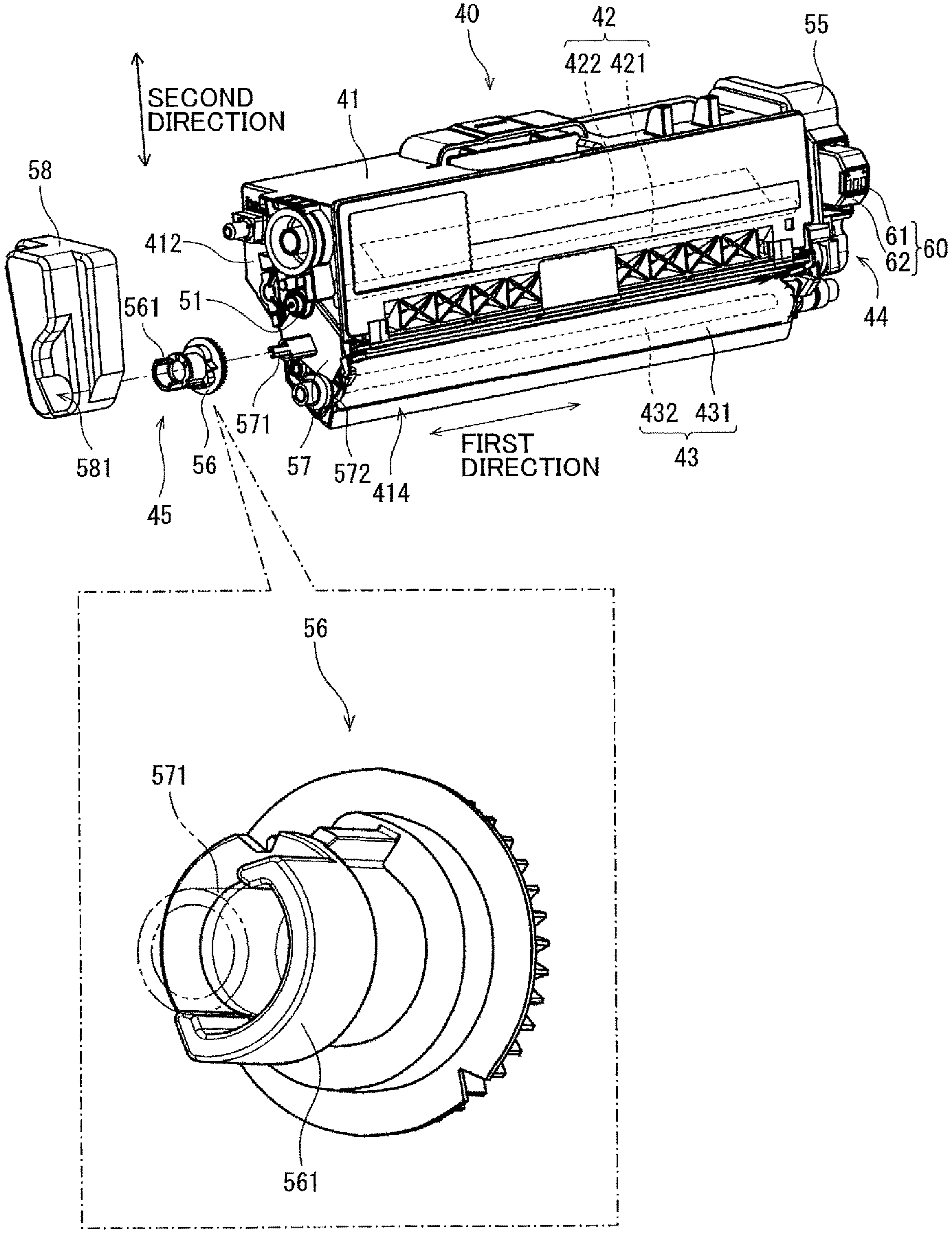
FIG. 9 is an exploded perspective view of the toner cartridge illustrated in FIG. 7.

As shown in FIG. 9, the second gear unit 45 is positioned at the second end surface 412 of the casing 41. The second gear unit 45 includes a second agitator gear 51, a detection gear 56, a conducting member 57, and a second cover 58.

The second agitator gear 51 is a gear for transmitting the rotation of the agitator shaft 421 to the detection gear 56. The second agitator gear 51 is rotatable about a rotational axis extending in the first direction. Gear teeth are provided at regular intervals around the entire outer circumferential portion of the second agitator gear 51. A portion of the gear teeth on the second agitator gear 51 and a portion of the gear teeth on the detection gear 56 are in engagement with each other when the toner cartridge 40 is in an unused (new) state. Further, the second agitator gear 51 is fixed to the other end in the first direction of the agitator shaft 421 so as to be incapable of rotating relative to the agitator shaft 421. Hence, when the agitator shaft 421 rotates, the second agitator gear 51 also rotates.

The detection gear 56 is a gear for transmitting information related to the toner cartridge 40 to the image forming apparatus 1A. Information related to the toner cartridge 40 includes information indicating whether the toner cartridge 40 is a unused cartridge (a new cartridge) or a used cartridge. The information related to the toner cartridge 40 also includes specifications of the toner cartridge 40. The specifications of the toner cartridge 40 include yield information indicating the quantity of toner in the toner cartridge 40 or the number of sheets that are printable with the toner in the toner cartridge 40.

The detection gear 56 is rotatable about a rotational shaft extending in the first direction. The detection gear 56 has gear teeth on a portion of the outer circumferential portion of the detection gear 56. When a new toner cartridge 40 is attached to the drawer unit 90 and the drawer unit 90 is accommodated in the image forming apparatus 1A, the coupling 52 of the new toner cartridge 40 receives a drive force from the image forming apparatus 1A. The drive force received by the coupling 52 is transmitted to the second agitator gear 51 via the idle gear 54, first agitator gear 50, and agitator 42, thereby rotating the second agitator gear 51. The detection gear 56 also rotates through its meshing engagement with the second agitator gear 51. When the detection gear 56 rotates a prescribed angle, the meshing engagement of the gear teeth provided on the portion of the detection gear 56 with the second agitator gear 51 is released and the rotation of the detection gear 56 stops.

In this way, once a toner cartridge 40 has been used on the image forming apparatus 1A, the detection gear 56 becomes disengaged from the second agitator gear 51. Hence, even if the toner cartridge 40 that has been used even once is removed from and attached again to the image forming apparatus 1A, the rotation of the second agitator gear 51 can no longer be transmitted to the detection gear 56. Consequently, the detection gear 56 does not rotate thereafter.

As shown in FIG. 9, the detection gear 56 includes a first protrusion 561. The first protrusion 561 protrudes in the first direction. The first protrusion 561 also extends along in an arc shape centered on the rotational axis of the detection gear 56. When the detection gear 56 rotates, the first protrusion 561 also rotates. In other words, the position of the first protrusion 561 changes as the detection gear 56 rotates.

The conducting member 57 is an electrically conductive member. A conductor, such as metal or conductive resin, is used as the material of the conducting member 57. The conducting member 57 is positioned at the second end surface 412 of the casing 41. The conducting member 57 includes a cylindrical gear shaft 571 that protrudes in the first direction. The detection gear 56 is supported on the gear shaft 571 and rotates about the same. As shown in FIG. 9, the first protrusion 561 partially covers the circumference of the gear shaft 571. The conducting member 57 also includes a bearing part 572. The bearing part 572 contacts the developing-roller shaft 432 of the developing roller 43.

The second cover 58 is fixed to the second end surface 412 of the casing 41. The second cover 58 has an opening 581. A portion of the first protrusion 561 and a portion of the gear shaft 571 are exposed through the opening 581. A lever 92 described later contacts the detection gear 56 or the gear shaft 571 through the opening 581.

Figure 10:
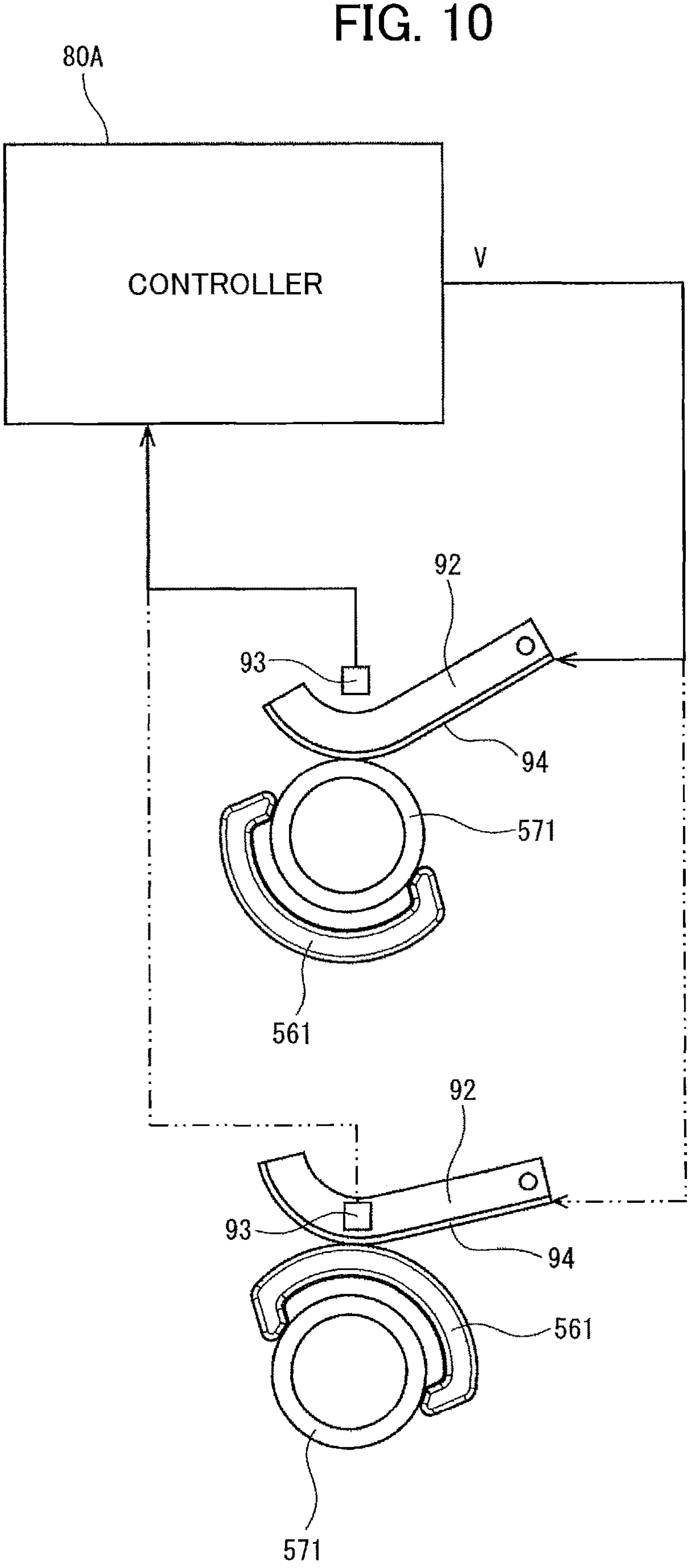
FIG. 10 is a view illustrating a control system for a new product detection performed in the toner cartridge illustrated in FIG. 6 using a detection gear.

The drawer unit 90 has the lever 92, and a photosensor 93. As shown in FIG. 10, the lever 92 can contact the gear shaft 571 and first protrusion 561.

An electrically conductive metal plate 94 is mounted on a surface of the lever 92. The controller 80A supplies electrical power to the metal plate 94. When the metal plate 94 contacts the gear shaft 571, as indicated in the upper portion of FIG. 10, the metal plate 94 is electrically connected to the conducting member 57 and developing-roller shaft 432. Thus, the developing-roller shaft 432 is maintained at a prescribed bias voltage by power supplied from the metal plate 94 when the image forming apparatus 1A is operated.

However, the first protrusion 561 only partially covers the outer circumferential surface of the gear shaft 571. Consequently, when the detection gear 56 rotates after an unused toner cartridge 40 is inserted into the drawer unit 90, the state of contact between the metal plate 94 and the gear shaft 571 varies in accordance with the shape of the detection gear 56. In this way, the lever 92 moves between a first position in which the metal plate 94 contacts the gear shaft 571, and a second position in which the metal plate 94 is separated from the gear shaft 571.

The photosensor 93 detects displacement of the lever 92 and transmits a detection signal to the controller 80A. For example, a sensor unit having a light-emitting element and a light-receiving element is employed as the photosensor 93.

When the lever 92 is in the first position, light emitted from the light-emitting element is incident on the light-receiving element because the light is not blocked by the lever 92. However, when the lever 92 is in the second position, light emitted from the light-emitting element is blocked by the lever 92 and, hence, is not incident on the light-receiving element. Thus, the photosensor 93 can identify whether the lever 92 is in the first position or the second position based on the incidence of light on the light-receiving element.

Based on detection signals obtained from the photosensor 93, the controller 80A can determine whether an attached toner cartridge 40 is unused and can distinguish the specifications of the toner cartridge 40. More specifically, the detection signal obtained from the photosensor 93 differs according to the number of protrusions possessed by the detection gear 56 and the length of the protrusion in the rotating direction of the detection gear 56. Based on changes in the detection signal, the controller 80A can distinguish among different specifications of toner cartridges 40.

The memory chip assembly 60 is disposed outward of the first end surface 411 of the casing 41. As shown in FIG. 8, the memory chip assembly 60 includes a toner memory 61 that is a memory chip, and the holder 62. The toner memory 61 is fixed to the outer surface of the holder 62. The holder 62 is retained by the first cover 55. The toner memory 61 has an electrical contact surface. The toner memory 61 can store various information related to the toner cartridge 40.

Next, a process executed by the controller 80A after a toner cartridge 40 is attached will be described.

When a toner cartridge 40 is attached to the drawer unit 90 and the drawer unit 90 is accommodated in the image forming apparatus 1A, the controller 80A writes information stored in the toner memory 61 to an apparatus body memory 15A provided in the main casing 10. In a case where new product determination information has been stored in the toner memory 61, the controller 80A copies the new product determination information to the apparatus body memory 15A.

However, when an unused toner cartridge 40 is attached to the image forming apparatus 1A for the first time, new product determination information has not been stored in the toner memory 61. Therefore, the controller 80A does not write new product determination information to the apparatus body memory 15A.

Next, the controller 80A performs new product detection for each of the four toner cartridges 40. Specifically, the controller 80A begins driving the motor to rotate the drive shafts. The rotation of each drive shaft is transmitted to the corresponding detection gear 56 via the corresponding coupling 52, idle gear 54, first agitator gear 50, agitator 42, and second agitator gear 51. Consequently, the corresponding detection gear 56 begins rotating. When the detection gear 56 rotates, the first protrusion 561 thereof rotates together with the detection gear 56. The inclination of the corresponding lever 92 changes in response to movement of the first protrusion 561. The photosensor 93 transmits a detection signal to the controller 80A that varies in response to the displacement of the lever 92. Consequently, the controller 80A acquires an input waveform that varies according to the rotation of the detection gear 56.

Thereafter, when the meshing engagement of the detection gear 56 with the second agitator gear 51 is released, the detection gear 56 stops rotating. Note that the controller 80A stops driving the motor when a preset time has elapsed since the start of driving of the motor.

Subsequently, the controller 80A determines whether the acquired input waveform is a new product waveform indicating that the toner cartridge 40 is new. The controller 80A also confirms information stored in the apparatus body memory 15A to determine whether new product determination information is stored in the toner memory 61. When the input waveform is a new product waveform and new product determination information is not present in the apparatus body memory 15A, the controller 80A determines that the toner cartridge 40 is new (unused) and in a normal state.

As described above, the image forming apparatus 1A according to the present embodiment includes a toner cartridge 40. The toner cartridge 40 includes a detection gear 56 rotatable about an axis extending in a prescribed direction. The detection gear 56 has a first protrusion 561 that is rotatable together with the detection gear 56. In the first determination process described above, the controller 80A determines that the toner cartridge 40 is unused based on the movement of the first protrusion 561 in accordance with the rotation of the detection gear 56 when the toner cartridge 40 is attached to the main casing 10. As with the controller 80 of the first embodiment, the controller 80A executes a first determination process, a second determination process, a third determination process, a storage process, a first control process, and a second control process. Additionally, when the controller 80A determines in the second determination process that the toner cartridge 40 is unused, the controller 80A executes a determination process for determining depletion information for the toner cartridge 40 based on the movement of the first protrusion 561. In the storage process described above, the controller 80A stores the consumption state information determined in the determination process in the toner memory 61 and the apparatus body memory 15A, unlike the above-described configuration that the controller 80 acquires consumption state information from the toner memory 32.

According to the above configuration, the controller 80A determines in S1 of the cartridge detection process described above (see FIG. 3) that the toner cartridge 40 is unused based on rotation of the detection gear 56. Further, no consumption state information has been stored in an unused toner cartridge 40. Hence, in S2 of the cartridge detection process, the controller 80A generates consumption state information indicating that the cartridge is unused, instead of reading of consumption state information from the cartridge memory. In S5 the controller 80A stores the generated consumption state information in the toner memory 61 and the apparatus body memory 15A. As in the image forming apparatus 1 according to the first embodiment, the controller 80A performs the same process shown in FIG. 4 for determining printability.

In this way, even in regard to a toner cartridge 40 having a cartridge memory in which no consumption state information 40 has been prestored, the controller 80A can determine whether the toner cartridge 40 attached to the main casing 10 is usable by performing the process in FIG. 4 using consumption state information. Accordingly, the controller 80A can determine whether a cartridge is usable in the image forming apparatus without writing new information to the toner memory 61.

Although the image forming apparatuses 1 and 1A described above are electrophotographic printers, the image forming apparatuses 1 and 1A may be inkjet printers. In this case, the cartridges are ink cartridges that supply ink. As an alternative, the cartridges may be tape cassettes that supply tape as the printing base material.

REMARKS

While the description has been made in detail with reference to the embodiments of the present disclosure, it would be apparent to those skilled in the art that many modifications and variations may be made thereto and the technical means employed in the different embodiments can be combined as appropriate.

What is claimed is:

1. An image forming apparatus comprising:

a main casing including a first memory;

a cartridge attachable to the main casing, the cartridge including:

material or a part used for forming images; and a second memory storing therein consumption state information representing a consumption state of the cartridge; and a controller configured to perform:

determining whether the cartridge attached to the main casing is unused;

storing, in response to determining that the cartridge attached to the main casing is unused, the consumption state information acquired from the second memory in the first memory;

determining whether the consumption state information stored in the first memory and the consumption state information stored in the second memory match each other;

permitting use of the cartridge in response to determining that the consumption state information stored in the first memory and the consumption state information stored in the second memory match each other; and prohibiting use of the cartridge in response to determining that the consumption state information stored in the first memory and the consumption state information stored in the second memory do not match each other.

2. The image forming apparatus according to claim 1, wherein the second memory stores therein identification information that is unique to the cartridge, and wherein, based on the consumption state information stored in the first memory and the consumption state information stored in the second memory, the controller determines whether to perform the permitting or the prohibiting without using the identification information stored in the second memory.

3. The image forming apparatus according to claim 1, wherein the controller is configured to further perform:

determining, in response to determining that the consumption state information stored in the first memory and the consumption state information stored in the second memory do not match each other:

whether a first number of image-formable sheets indicated by the consumption state information stored in the first memory is greater than a second number of image-formable sheets indicated by the consumption state information stored in the second memory; or whether the first number of image-formable sheets is less than the second number of image-formable sheets;

determining, in response to determining that the first number of image-formable sheets is greater than the second number of image-formable sheets or that the first number of image-formable sheets is less than the second number of image-formable sheets, whether a difference between the first number of image-formable sheets and the second number of image-formable sheets is less than or equal to a prescribed value; and updating, in response to determining that the difference between the first number of image-formable sheets and the second number of image-formable sheets is less than or equal to the prescribed value:

the consumption state information stored in the first memory with the consumption state information stored in the second memory; or the consumption state information stored in the second memory with the consumption state information stored in the first memory, and wherein the prohibiting is performed in response to determining that the difference between the first number of image-formable sheets and the second number of image-formable sheets is greater than the prescribed value.

4. The image forming apparatus according to claim 1, wherein the cartridge includes a detection gear rotatable about an axis extending in a prescribed direction, the detection gear including a protrusion rotatable together with the detection gear, wherein, in the determining whether the cartridge attached to the main casing is unused, the controller determines that the cartridge is unused based on movement of the protrusion in accordance with rotation of the detection gear when the cartridge is attached to the main casing, and wherein the controller is configured to further perform:

determining, in response to determining that the cartridge is unused, the consumption state information based on the movement of the protrusion; and storing the determined consumption state information in both the first memory and the second memory.

5. The image forming apparatus according to claim 1, wherein the cartridge is:

a toner cartridge configured to accommodate toner therein; or a drum cartridge including a photosensitive drum.

6. A control method for controlling an image forming apparatus, the control method comprising:

determining whether a cartridge attached to a main casing of the image forming apparatus is unused;

storing, in response to determining that the cartridge attached to the main casing is unused, consumption state information stored in a second memory of the attached cartridge in a first memory of the image forming apparatus, the consumption state information representing a consumption state of the cartridge;

determining whether the consumption state information stored in the first memory and the consumption state information stored in the second memory match each other;

permitting use of the cartridge in response to determining that the consumption state information stored in the first memory and the consumption state information stored in the second memory match each other; and prohibiting use of the cartridge in response to determining that the consumption state information stored in the first memory and the consumption state information stored in the second memory do not match each other.

7. A cartridge comprising:

a cartridge casing including material or a part used for forming images;

a cartridge memory storing therein consumption state information representing a consumption state of the cartridge; and a gear rotatable about an axis extending in a prescribed direction, wherein the consumption state information stored in the cartridge memory is stored in an image forming apparatus after the gear rotates in a state where the cartridge is attached to the image forming apparatus, and wherein whether the cartridge is usable in the image forming apparatus is determinable based on whether the consumption state information stored in the cartridge memory matches the consumption state information stored in the image forming apparatus.

8. The cartridge according to claim 7, wherein the gear includes a protrusion rotatable together with the gear, and wherein the consumption state information is determined based on movement of the protrusion in accordance with rotation of the gear.

9. The cartridge according to claim 7,
wherein the cartridge casing is configured to accommodate toner therein.

* * * * *